US012583305B2

(12) United States Patent
Birajdar et al.

(10) Patent No.: US 12,583,305 B2
(45) Date of Patent: Mar. 24, 2026

(54) MODULAR PLATFORM FOR VEHICLE

(71) Applicant: Karma Automotive LLC, Irvine, CA (US)

(72) Inventors: Vyankatesh Birajdar, Irvine, CA (US); Shripad Vijapure, Irvine, CA (US); Sandip Jadhav, Irvine, CA (US)

(73) Assignee: Karma Automotive, Inc., Irvine, CA (US)

( * ) Notice: Subject to any disclaimer, the term of this patent is extended or adjusted under 35 U.S.C. 154(b) by 246 days.

(21) Appl. No.: 18/300,060

(22) Filed: Apr. 13, 2023

(65) Prior Publication Data

US 2024/0343102 A1    Oct. 17, 2024

(51) Int. Cl.
B60K 1/04    (2019.01)
B60R 19/24    (2006.01)
B62D 21/11    (2006.01)

(52) U.S. Cl.
CPC ............... B60K 1/04 (2013.01); B60R 19/24 (2013.01); B62D 21/11 (2013.01); B60K 2001/0438 (2013.01)

(58) Field of Classification Search
CPC ........ B62D 21/07; B62D 63/02; B62D 21/11; B60K 1/04; B60K 2001/0438; B60R 19/24
USPC ........................................................ 180/68.5
See application file for complete search history.

(56) References Cited

U.S. PATENT DOCUMENTS

| | | | | | |
|---|---|---|---|---|---|
| 5,681,057 A | * | 10/1997 | Whirley | ................. | B60L 50/66 |
| | | | | | 180/68.5 |
| 6,406,088 B1 | * | 6/2002 | Tate | ..................... | B62D 21/152 |
| | | | | | 296/203.02 |
| 6,773,044 B2 | * | 8/2004 | Schambre | ............... | B60R 19/40 |
| | | | | | 293/118 |
| 6,893,065 B2 | * | 5/2005 | Seksaria | ................. | B60R 19/03 |
| | | | | | 296/203.02 |
| 7,210,719 B2 | * | 5/2007 | Honda | .................... | B60R 19/18 |
| | | | | | 293/133 |
| 7,954,866 B2 | * | 6/2011 | Barcomb | ................ | B60R 19/02 |
| | | | | | 293/143 |
| 8,020,906 B2 | * | 9/2011 | Schmid | ................... | B60R 19/34 |
| | | | | | 293/133 |
| 8,567,855 B2 | * | 10/2013 | Gadhiya | ................. | B60L 58/21 |
| | | | | | 296/203.02 |
| 8,632,108 B2 | * | 1/2014 | Matuschek | .......... | B62D 21/152 |
| | | | | | 293/133 |

(Continued)

OTHER PUBLICATIONS

International Search Report and Written Opinion (EPO) for Application No. PCT/US2024/023664 dated Jul. 23, 2024.

*Primary Examiner* — James A Shriver, II
*Assistant Examiner* — Hilary L Johns
(74) *Attorney, Agent, or Firm* — Honigman LLP; Grant Griffith; Thomas Appledorn

(57)    ABSTRACT

A modular platform for a vehicle includes a scalable frame structure. The scalable frame structure includes a front frame portion configured to receive a front vehicle suspension, a rear frame portion configured to receive a rear vehicle suspension, and a pair of rails extending between the front frame portion and the rear frame portion along opposing sides of the frame structure. A length of the pair of rails is scalable to adjust a wheelbase of the vehicle between the front vehicle suspension and the rear vehicle suspension. A battery pack is supported on the frame structure.

25 Claims, 16 Drawing Sheets

(56)                    References Cited

U.S. PATENT DOCUMENTS

| | | | | |
|---|---|---|---|---|
| 9,073,502 | B2 * | 7/2015 | Blumel | .................. B21C 23/00 |
| 2007/0222239 | A1 * | 9/2007 | Arns | ...................... B60R 19/34 |
| | | | | 293/132 |
| 2019/0210470 | A1 * | 7/2019 | Thomas | ................ B62D 25/20 |
| 2022/0348260 | A1 * | 11/2022 | Harmon | ................ B62D 27/00 |

* cited by examiner

MODULAR PLATFORM FOR VEHICLE

TECHNICAL FIELD

This disclosure relates to modular platforms for vehicles, and more particularly, modular platforms for electric vehicles.

BACKGROUND

It is known to provide a vehicle structural frame that supports a vehicle suspension, a drivetrain, one or more vehicle batteries for electrically powering the drivetrain, and a vehicle body providing a cabin to accommodate the occupants of the vehicle. However, vehicles in different segments (e.g., coupes, sedans, SUVs, and the like) typically require distinct frames that are designed and manufactured with diverse components and constructions configured for the particular product line. This leads to expensive and time-consuming product development and manufacturing processes that can result in high waste and increased business risk.

SUMMARY

One aspect of the disclosure provides a modular platform for a vehicle. The modular platform includes a scalable frame structure that includes a front frame portion configured to receive a front vehicle suspension, a rear frame portion configured to receive a rear vehicle suspension, and a pair of rails extending between the front frame portion and the rear frame portion along opposing sides of the frame structure. A length of the pair of rails is scalable to adjust a wheelbase of the vehicle between the front vehicle suspension and the rear vehicle suspension. A battery pack is supported on the frame structure.

Implementations of the disclosure may include one or more of the following optional features. In some implementations, each rail of the pair of rails includes an extruded rail. The extruded rail is trimmed to a first length to adjust the wheelbase of the vehicle to a first wheelbase. Alternatively, the extruded rail is trimmed to a second length that is less than the first length to adjust the wheelbase of the vehicle to a second wheelbase that is less than the first wheelbase. In further implementations, the extruded rail includes a first mounting position configured to receive one of the front frame portion or the rear frame portion when the extruded rail is trimmed to the first length. The extruded rail further includes a second mounting position configured to receive the one of the front frame portion or the rear frame portion when the extruded rail is trimmed to the second length. Further, the extruded rail includes one or more third mounting positions configured to receive the other of the front frame portion or the rear frame portion. In even further implementations, when the extruded rail is trimmed to the second length, the extruded rail is trimmed between the first mounting position and the second mounting position and the first mounting position is removed from the extruded rail.

In some examples, the front frame portion includes a front frame cross-member that extends between respective first ends of the pair of rails. A length of the front frame cross-member is scalable to adjust a wheel track of the vehicle between a pair of wheels coupled to the front vehicle suspension. In further examples, the front frame cross-member includes an extruded cross-member. The extruded cross-member is trimmed to a first length to adjust the wheel track to a first wheel track. Alternatively, the extruded cross-member is trimmed to a second length that is less than the first length to adjust the wheel track to a second wheel track that is less than the first wheel track. In some further examples, the front frame cross-member includes a first flange that extends along the length of the front frame cross-member and that is configured to support a floor panel of the vehicle at a first floor height relative to the pair of rails. In those further examples, the front frame cross-member also includes a second flange that extends along the length of the front frame cross-member and above the first flange and that is configured to support the floor panel at a second floor height relative to the pair of rails that is above the first floor height. In even further examples, the vehicle includes a sedan or a coupe and the first flange of the front frame cross-member supports the floor panel, or the vehicle includes an SUV and the second flange of the front frame cross-member supports the floor panel. In other even further examples, the floor panel, when supported at the front frame cross-member, extends above and along the battery pack supported on the frame structure.

Optionally, respective lengths of the front vehicle suspension and the rear vehicle suspension are scalable to adjust a ground clearance of the vehicle between the frame structure and a ground surface. The pair of rails may extend along and mount to opposing sides of the battery pack to support the battery pack on the frame structure. Moreover, the frame structure may be configured to support a body of the vehicle. The battery pack may be operable to electrically power a drivetrain of the vehicle.

Another aspect of the disclosure provides a vehicle. The vehicle includes a scalable frame structure that includes a front frame portion configured to receive a front vehicle suspension, a rear frame portion configured to receive a rear vehicle suspension, and a pair of rails extending between the front frame portion and the rear frame portion along opposing sides of the frame structure. A length of the pair of rails is scalable to adjust a wheelbase of the vehicle between the front vehicle suspension and the rear vehicle suspension. A battery pack is supported on the frame structure and is operable to electrically power a drivetrain of the vehicle.

Implementations of the disclosure may include one or more of the following optional features. In some implementations, each rail of the pair of rails includes an extruded rail. The extruded rail is trimmed to a first length to adjust the wheelbase of the vehicle to a first wheelbase. Alternatively, the extruded rail is trimmed to a second length that is less than the first length to adjust the wheelbase of the vehicle to a second wheelbase that is less than the first wheelbase. In further implementations, the extruded rail includes a first mounting position configured to receive one of the front frame portion or the rear frame portion when the extruded rail is trimmed to the first length. The extruded rail further includes a second mounting position configured to receive the one of the front frame portion or the rear frame portion when the extruded rail is trimmed to the second length. Further, the extruded rail includes one or more third mounting positions configured to receive the other of the front frame portion or the rear frame portion. In even further implementations, when the extruded rail is trimmed to the second length, the extruded rail is trimmed between the first mounting position and the second mounting position and the first mounting position is removed from the extruded rail.

In some examples, the front frame portion includes a front frame cross-member that extends between respective first ends of the pair of rails. A length of the front frame cross-member is scalable to adjust a wheel track of the vehicle between a pair of wheels coupled to the front vehicle suspension. In further examples, the front frame cross-member includes an extruded cross-member. The extruded cross-member is trimmed to a first length to adjust the wheel track to a first wheel track. Alternatively, the extruded cross-member is trimmed to a second length that is less than the first length to adjust the wheel track to a second wheel track that is less than the first wheel track. In some further examples, the front frame cross-member includes a first flange that extends along the length of the front frame cross-member and that is configured to support a floor panel of the vehicle at a first floor height relative to the pair of rails. In those further examples, the front frame cross-member also includes a second flange that extends along the length of the front frame cross-member and above the first flange and that is configured to support the floor panel at a second floor height relative to the pair of rails that is above the first floor height. In even further examples, the vehicle includes a sedan or a coupe and the first flange of the front frame cross-member supports the floor panel, or the vehicle includes an SUV and the second flange of the front frame cross-member supports the floor panel. In other even further examples, the floor panel, when supported at the front frame cross-member, extends above and along the battery pack supported on the frame structure.

Optionally, respective lengths of the front vehicle suspension and the rear vehicle suspension are scalable to adjust a ground clearance of the vehicle between the frame structure and a ground surface. The pair of rails may extend along and mount to opposing sides of the battery pack to support the battery pack on the frame structure. Moreover, the frame structure may be configured to support a body of the vehicle.

Yet another aspect of the disclosure provides a method for manufacturing a modular platform for a vehicle. The method includes mounting a frame portion at respective first ends of a pair of extruded rails. The front frame portion is configured to receive a front vehicle suspension. The method includes mounting a rear frame portion at respective second ends of the pair of extruded rails, the respective second ends opposite the respective first ends. The rear frame portion is configured to receive a rear vehicle suspension. Before mounting the front frame portion and the rear frame portion at the pair of extruded rails, the method includes trimming the pair of extruded rails to a first length or a second length that is less than the first length. The pair of extruded rails are trimmed to the first length to provide a first wheelbase of the vehicle between the front vehicle suspension and the rear vehicle suspension. The pair of extruded rails are trimmed to the second length to provide a second wheelbase of the vehicle that is less than the first wheelbase.

Implementations of the disclosure may include one or more of the following optional features. In some implementations, the front frame portion includes a front frame cross-member that, with the front frame portion mounted at the respective first ends of the pair of extruded rails, extends between the respective first ends of the pair of extruded rails. In those implementations, the method further includes, before mounting the front frame portion at the pair of extruded rails, trimming the front frame cross-member to a first length to adjust a wheel track of the vehicle between a pair of wheels coupled to the front vehicle suspension to a first wheel track, or a second length that is less than the first length to adjust the wheel track to a second wheel track that is less than the first wheel track. In further implementations, the front frame cross-member includes a first flange that extends along the length of the front frame cross-member and that is configured to support a floor panel of the vehicle at a first floor height relative to the pair of extruded rails. In those further implementations, the front cross-member includes a second flange that extends along the length of the front frame cross-member and above the first flange and that is configured to support the floor panel at a second floor height relative to the pair of extruded rails that is above the first floor height. In even further implementations, the vehicle includes a sedan or a coupe and the method further includes mounting the floor panel at the first flange of the front frame cross-member. Alternatively, the vehicle includes an SUV and the method further includes mounting the floor panel at the second flange of the front frame cross-member.

In some examples, the method further includes, with the front frame portion and the rear frame portion mounted at the pair of extruded rails to form a frame structure of the vehicle, mounting a battery pack at the frame structure.

The details of one or more implementations of the disclosure are set forth in the accompanying drawings and the description below. Other aspects, features, and advantages will be apparent from the description and drawings, and from the claims.

5

Figure 20:
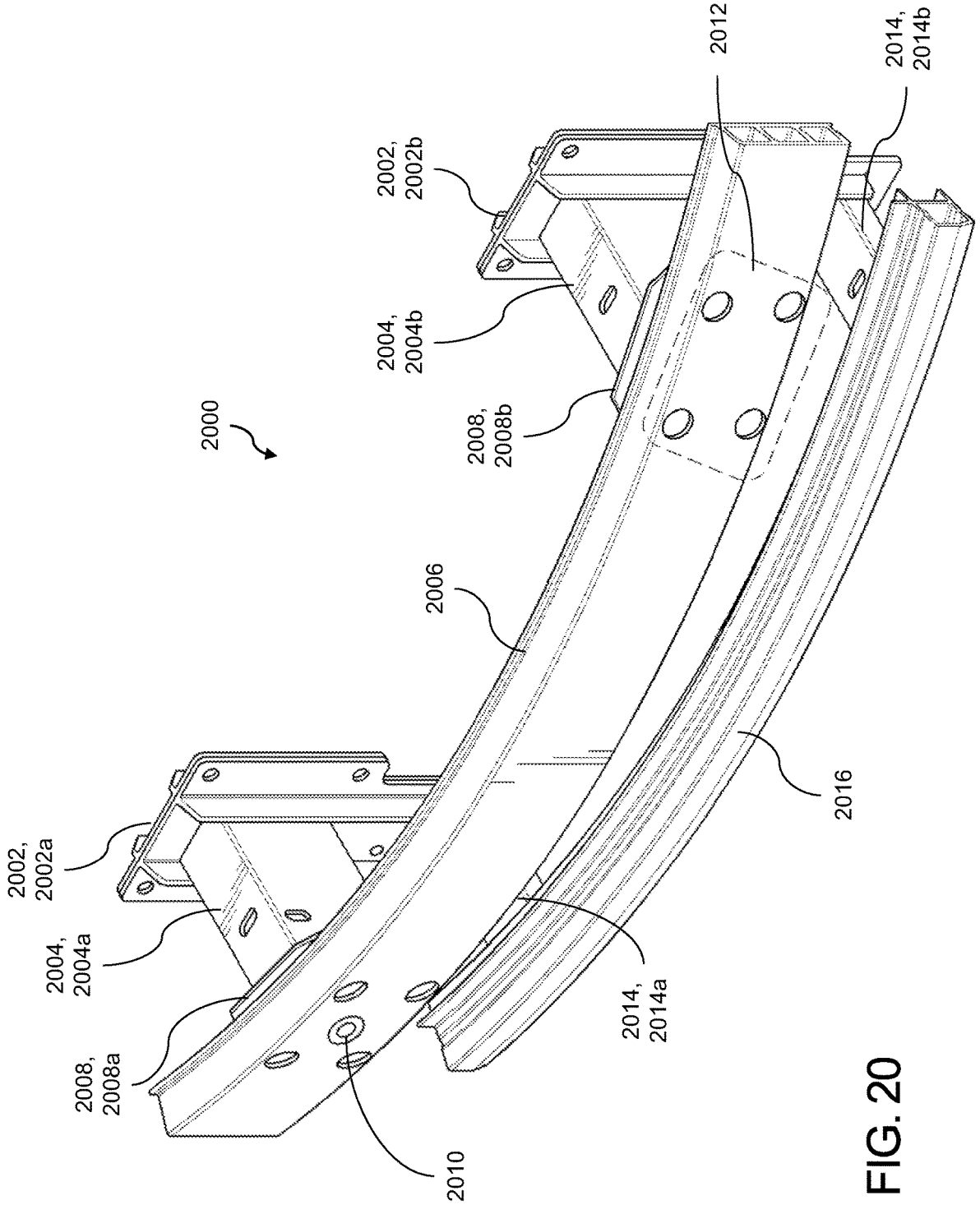

FIG. 20 is a perspective view of a front crash management system.

Figures 21, 22, 23, 24, 25:
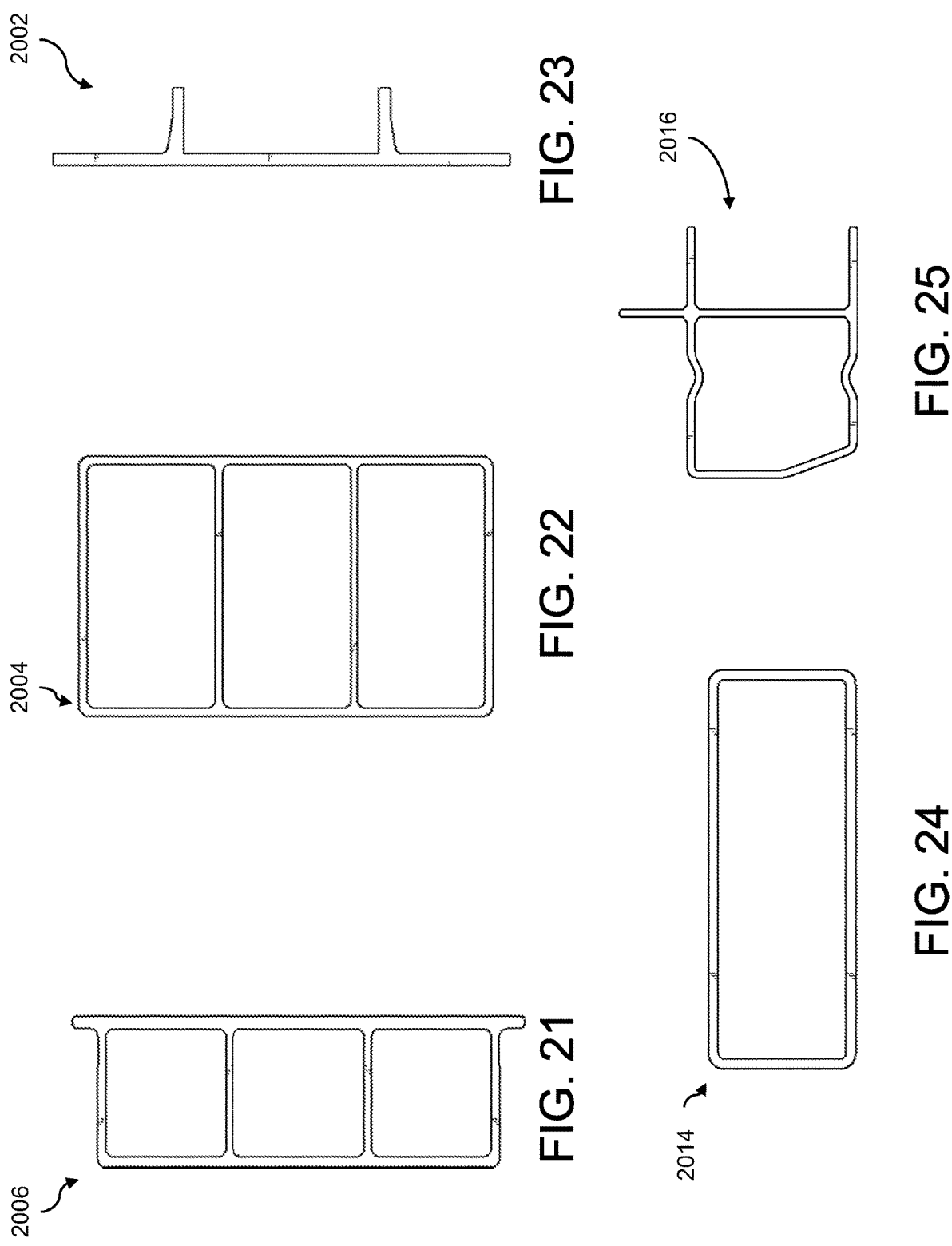

FIG. 21 is a sectional view of a front bumper beam of the front crash management system.

FIG. 22 is a sectional view of a crash rail of the front crash management system.

FIG. 23 is a sectional view of a front rail mounting bracket of the front crash management system.

FIG. 24 is a sectional view of an ankle catcher rail of the front crash management system.

FIG. 25 is a sectional view of an ankle catcher of the front crash management system.

Figures 26A, 26B:
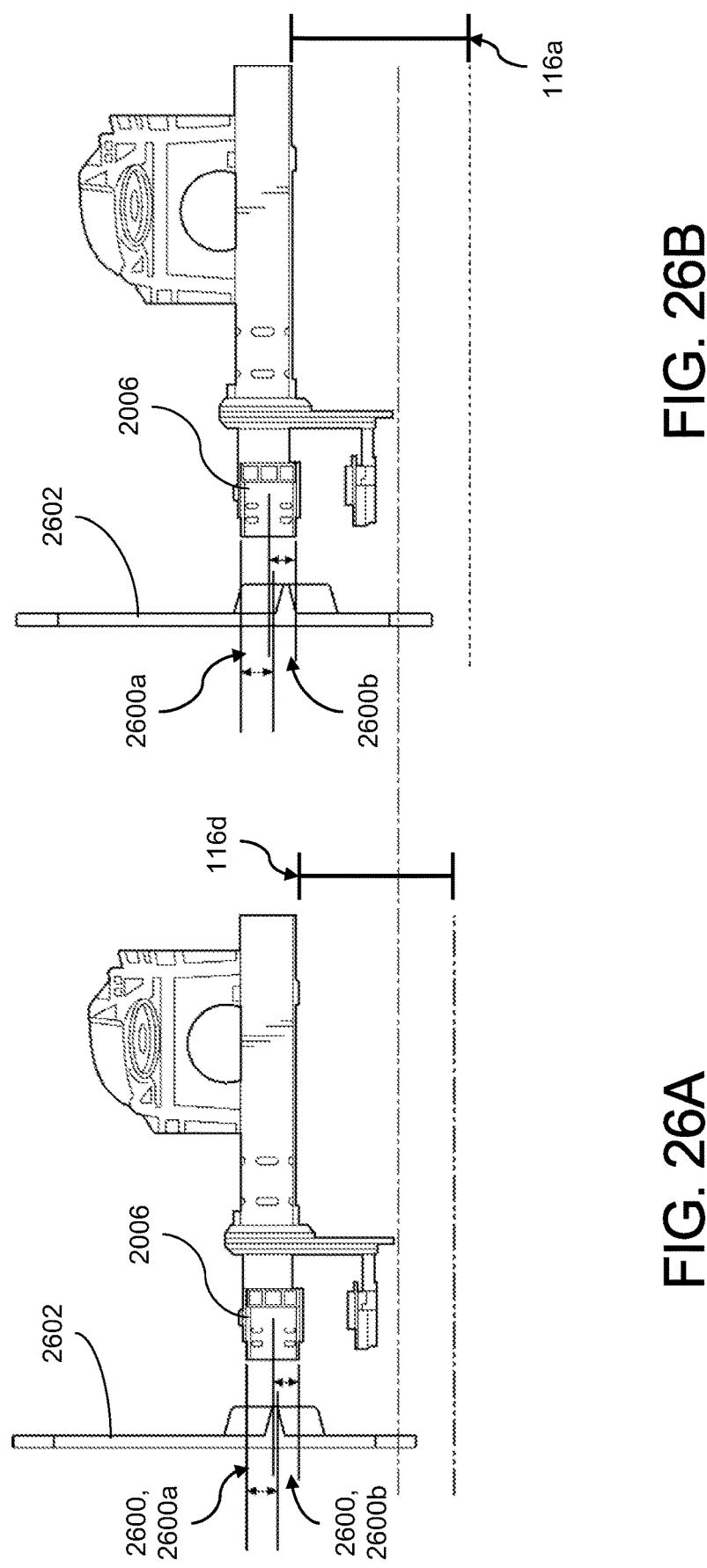

FIG. 26A is a side view of a modular platform with the front crash management system and having a lower ground clearance during a frontal crash test.

FIG. 26B is a side view of a modular platform with the front crash management system and having a higher ground clearance during a frontal crash test.

Like reference symbols in the various drawings indicate like elements.

DETAILED DESCRIPTION

Referring to FIGS. 1-4, a vehicle 100, such as a battery-powered electric vehicle or a plug-in hybrid vehicle, includes a vehicle body 102 providing an interior cabin for occupants of the vehicle and that is supported on a modular platform 200. The modular platform 200 includes a scalable frame structure 201 receiving and supporting a front vehicle suspension 106, a rear vehicle suspension 108, and a battery pack 110 that electrically powers a drivetrain of the vehicle 100. As discussed further below, the modular platform 200 is configurable during assembly to adjust dimensions of the modular platform 200 such that, based on the configured dimensions of the platform 200, the platform 200 may be used to produce a vehicle 100 that is one of a variety of different vehicle types when the modular platform 200 is mated to a corresponding vehicle body 102.

For example, a length of the frame structure 201 is scalable to adjust a wheelbase 112 of the vehicle 100 between the front vehicle suspension 106 and the rear vehicle suspension 108 (e.g., a distance between a front axle of the vehicle and a rear axle of the vehicle). A width of the frame structure 201 is scalable to adjust a wheel track 114 of the vehicle 100 between respective wheels 104 coupled to the front vehicle suspension 106 and/or the rear vehicle suspension 108 (e.g., a distance between a driver-side front wheel of the vehicle and a passenger-side front wheel of the vehicle). Further, a length of the front vehicle suspension 106 and/or the rear vehicle suspension 108 is scalable to adjust a ground clearance or ground height 116 of the vehicle 100 between the frame structure 201 and a ground surface. Based on the wheelbase 112, wheel track 114, and/or ground clearance 116 provided by the modular platform 200, the modular platform 200 may be mated with a corresponding vehicle body 102 to produce any suitable vehicle type, such as a coupe, a sedan, a sport utility vehicle (SUV), a cross-over utility vehicle (CUV), a delivery truck or fleet vehicle, and the like. For example, the wheelbase 112 may be shortened and the ground clearance 116 may be reduced to produce a coupe, while the wheelbase 112 may be lengthened and the ground clearance 116 may be increased to produce an SUV.

Thus, the modular platform 200 may be integrated with the vehicle body 102 to produce a vehicle 100 in a variety of different segments, with only minor alterations required during assembly of the modular platform 200 to produce a platform 200 having the characteristics and dimensions associated with the desired vehicle segment. In other words, common or standard components are assembled to produce a modular platform 200 suitable for production of one type of vehicle as those assembled to produce a modular platform 200 suitable for production of another type of vehicle, with one or more modifications made to the common or standard components during assembly that result in the differences in dimensions of the vehicle 100 (e.g., the wheelbase 112, wheel track 114, and/or ground clearance 116). For example, and as discussed further below, one or more members of the scalable frame structure 201 may include extruded rails or beams that, during or prior to assembly of the modular platform 200, are trimmed to a desired length to achieve the desired wheelbase 112 or wheel track 114 of the vehicle 100. Thus, with many other parts remaining the same between vehicle segments and product lines, part inventory may be reduced, product development may be accelerated, and assembly may be simplified.

The scalable frame structure 201 includes a front frame portion 202 that receives the front vehicle suspension 106, a rear frame portion 204 that receives the rear vehicle suspension 108, and a pair of rocker assemblies or rails 206, 206a-b that extend between the front frame portion 202 and the rear frame portion 204 along opposing sides of the frame structure 201. That is, a first rail 206, 206a extends along a first side of the frame structure 201 between the front frame portion 202 and the rear frame portion 204 and a second rail 206, 206b extends along a second side of the frame structure 201 between the front frame portion 202 and the rear frame portion 204. One or more cross-members 208 may extend between the first rail 206a and the second rail 206b at respective positions along the rails 206 between the front frame portion 202 and the rear frame portion 204, such as to provide structural support to the frame structure 201 and to support one or more floor panels 210 that extend between the rails 206 and between the front frame portion 202, rear frame portion 204, and the respective one or more cross-members 208.

The first rail 206a, the second rail 206b, the front frame portion 202, and the rear frame portion 204 cooperate to define a battery receiving portion of the frame structure 201, with the battery pack 110 received between and supported by the battery receiving portion of the frame structure 201. The battery pack 110 is supported on the frame structure 201, with the one or more floor panels 210 and the one or more cross-members 208 extending along and over the battery pack 110.

In the illustrated example, the front frame portion 202 includes a front frame cross-member 212 extending between opposing torque boxes 214, 214a-b. A first torque box 214, 214a mounts to a first end or front end 205a of the first rail 206a and a second torque box 214, 214b mounts to a first end or front end 205b of the second rail 206b, with the front frame cross-member 212 extending between the first torque box 214a and the second torque box 214b.

Optionally, the first torque box 214a includes a first or inner portion or torque box inner 216a and a second or outer portion or torque box outer 218a and the second torque box 214b includes a first or inner portion or torque box inner 216b and a second or outer portion or torque box outer 218b. For the first torque box 214a and the second torque box 214b, the respective torque box inner 216a, 216b is mated to the respective torque box outer 218a, 218b (e.g., welded together), with the torque box inner 216a, 216b mounting to the respective rail 206 and the torque box outer 218a, 218b mounting or mating to the front frame cross-member 212 (e.g., welded to the front frame cross-member).

In the event of a front collision of the vehicle, the torque boxes 214 perform the main role to transfer the load to the rails 206 and the front frame cross-member 212 to support the frontal load path strategy. As described further below, the two-piece torque box 214 may be formed from aluminum casting or extruding to eliminate a requirement for different parts between different vehicle segments, thus reducing manufacturing build variation and lowering manufacturing costs.

Respective front rails 220, 220a-b extend from the torque boxes 214 and/or the front frame cross-member 212 and receive the front vehicle suspension 106, such as at respective shock towers 221, 221a-b mounted at the respective front rails 220. That is, a first front rail 220, 220a and a second front rail 220, 220b extend from the front frame portion 202 and cooperate to support the front vehicle suspension 106 on the frame structure 201 at a first shock tower 221, 221a of the first rail 220a and a second shock tower 221, 221b of the second rail 220b. Optionally, the front rails 220 are integrally formed with the respective torque boxes 214 or the front frame cross-member 212.

In the illustrated example, the rear frame portion 204 includes respective C-pillars 222, 222a-b mounted to the rails 206. That is, a first C-pillar 222, 222a mounts to a second end or rear end 207a of the first rail 206a and a second C-pillar 222, 222b mounts to a second end or rear end 207b of the second rail 206b. Optionally, a respective one of the one or more cross-members 208 extends between the first rail 206a and the second rail 206b and the first C-pillar 222a and the second C-pillar at or near the rear end 207a of the first rail 206a and the rear end 207b of the second rail 206b. The respective cross-member 208 may be mounted to the respective rails 206 or the respective C-pillars 222.

Respective rear rails 224, 224a-b extend from the C-pillars 222 and receive the rear vehicle suspension 108. That is, a first rear rail 224, 224a extends from the first C-pillar 222a and a second rear rail 224, 224b extends from the second C-pillar 222b and the rear rails 224 cooperate to support the rear vehicle suspension 108 on the frame structure 201. Optionally, the rear rails 224 are integrally formed with the respective C-pillars 222.

Each respective C-pillar 222 is designed as a single piece aluminum casting or extrusion. As discussed further below, this supports the ability of the modular platform 200 to provide a variable wheelbase 112 and the single piece casting improves assembly process quality and reduces processing time and cost. Further, the C-pillar casting supports the rear suspension 108 and provides attachment for the rear crash rail and bumper beam.

With the front frame portion 202 and the rear frame portion 204 standard to the modular platform 200, a length 209 of the pair of rails 206 is scalable prior to or during assembly of the frame structure 201 to adjust the wheelbase 112 of the finished vehicle 10. In other words, in order to adjust the wheelbase 112 of the vehicle 10 (e.g., to produce a coupe having a shorter wheelbase or to produce a sedan or SUV having a longer wheelbase), the length 209 of the rails 206 is scaled or adjusted prior to mounting the rails 206 to the front frame portion 202 and the rear frame portion 204.

Figure 1:
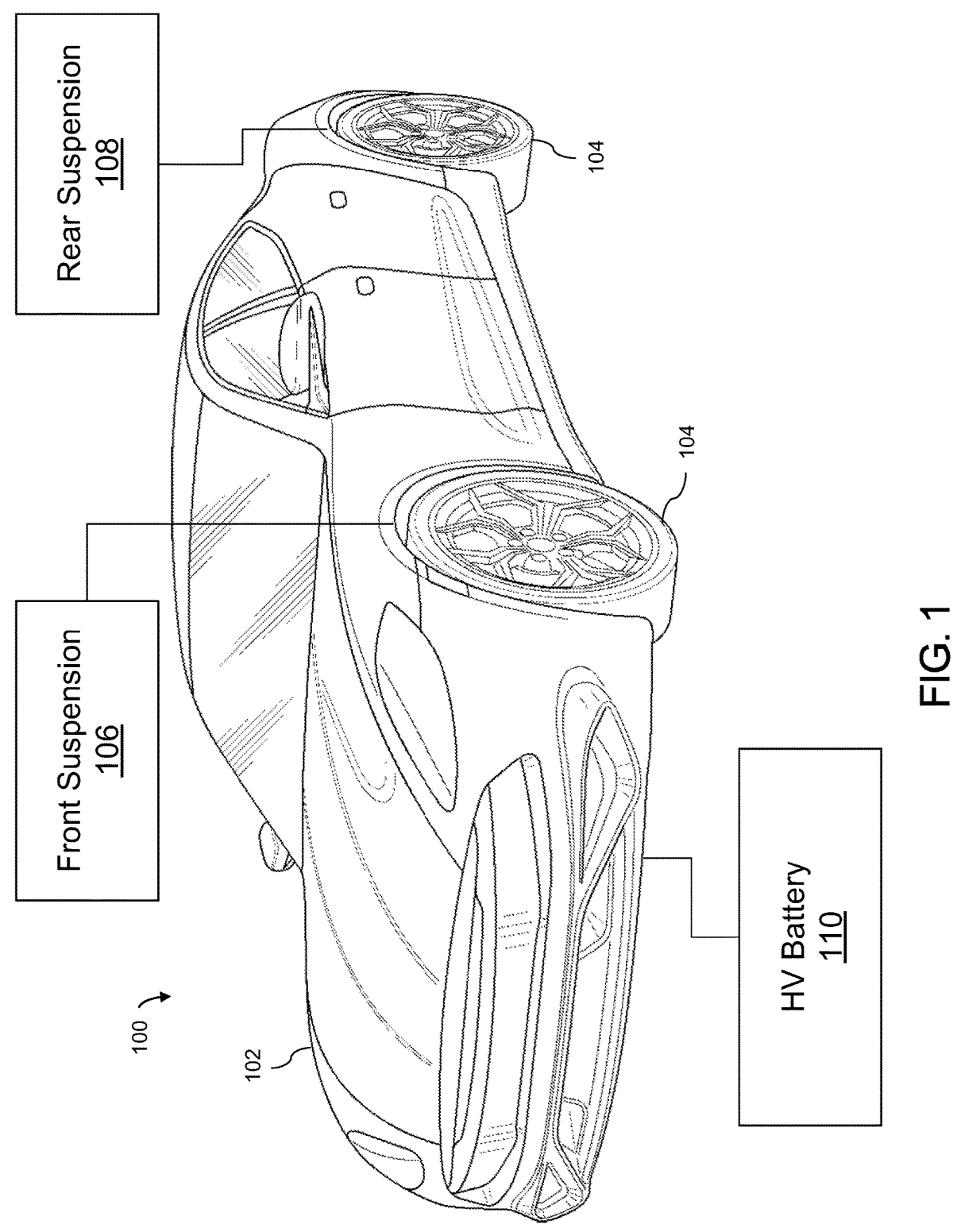
FIG. 1 is a perspective view of a vehicle having a modular platform with a scalable frame structure.
Figure 2:
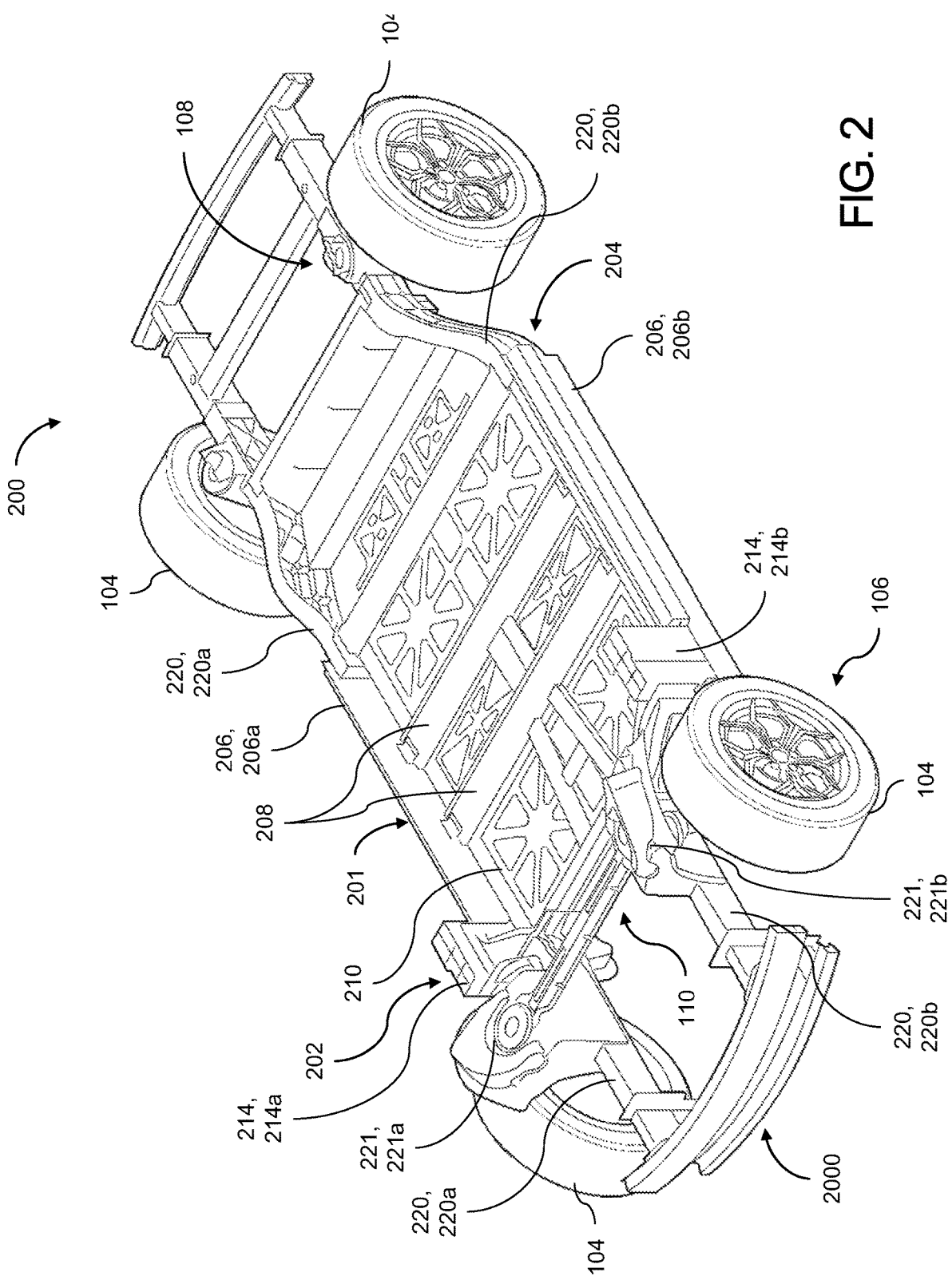
FIG. 2 is a perspective view of the modular platform.
Figure 3:
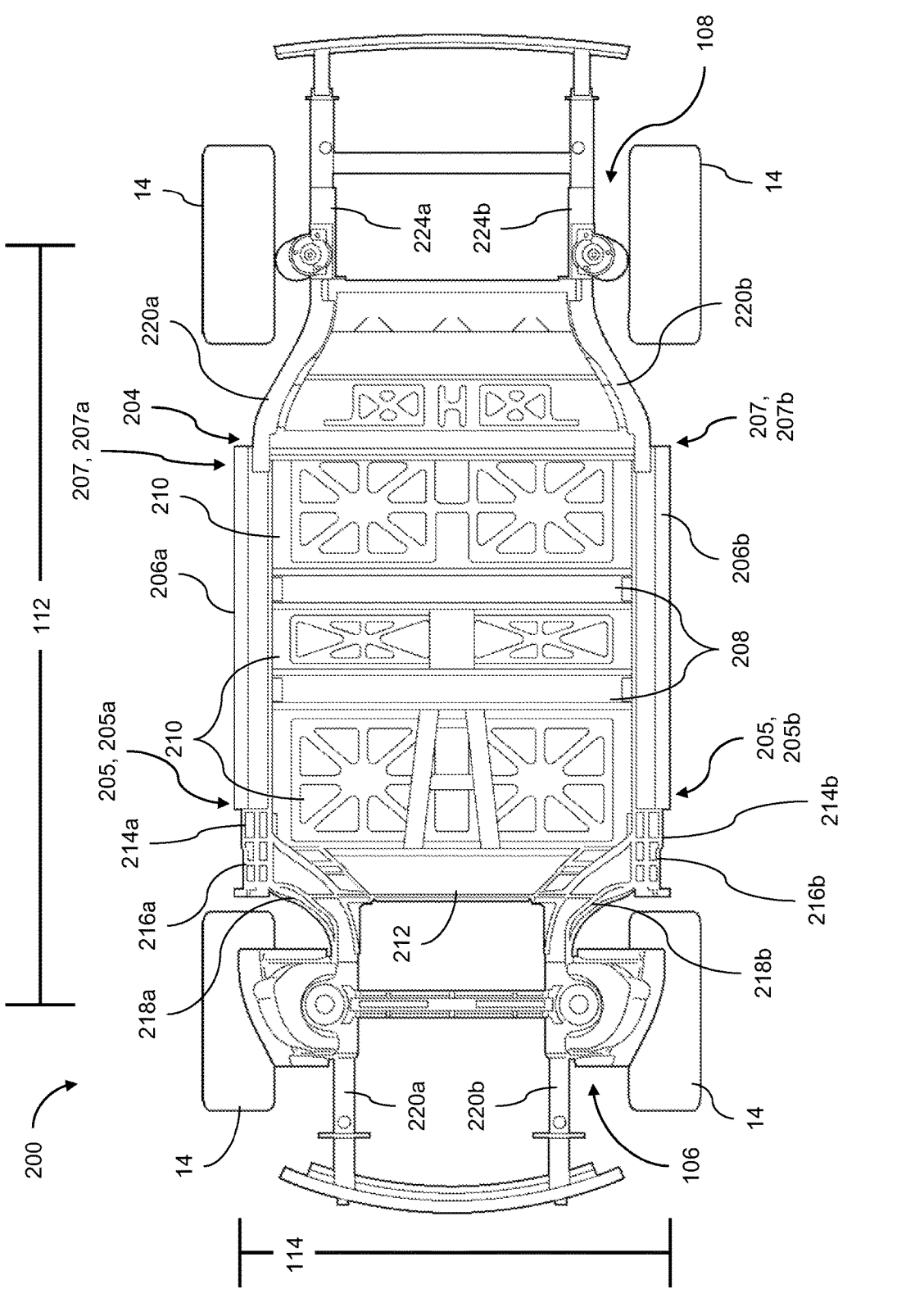
FIG. 3 is a plan view of the modular platform.
Figure 4:
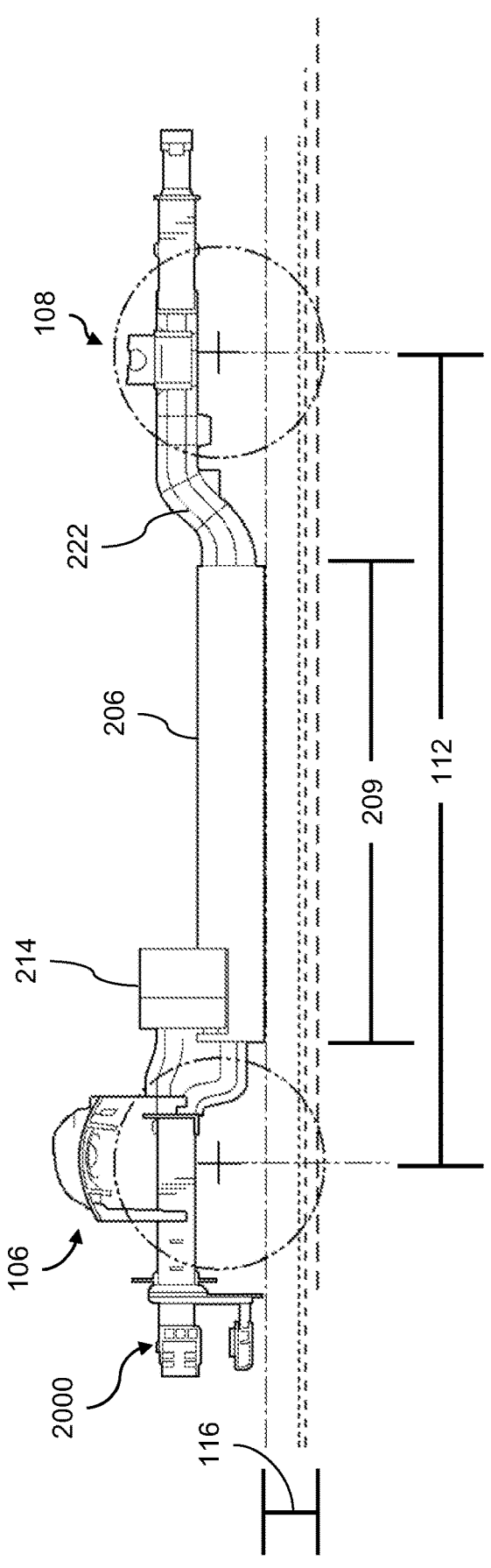
FIG. 4 is a side view of the modular platform, showing possible ground clearances between the frame structure and a ground surface, based on scalable front and rear vehicle suspensions coupled to the frame structure.
Figures 5, 6, 7:
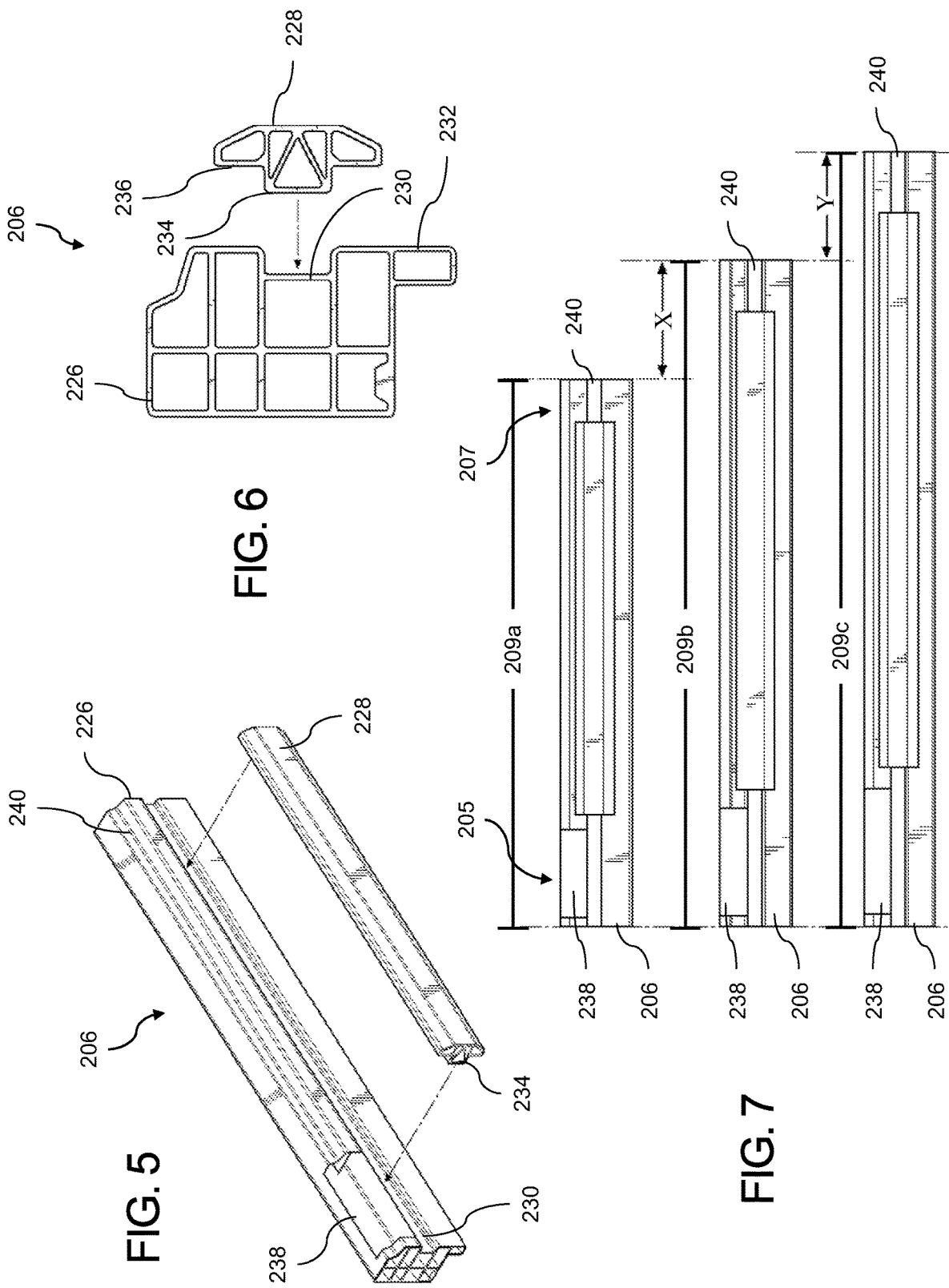
FIGS. 5 and 6 are exploded views of a scalable extruded rail of the frame structure.
FIG. 7 includes side views of extruded rails of the frame structure formed or trimmed to different lengths.
Figure 8:
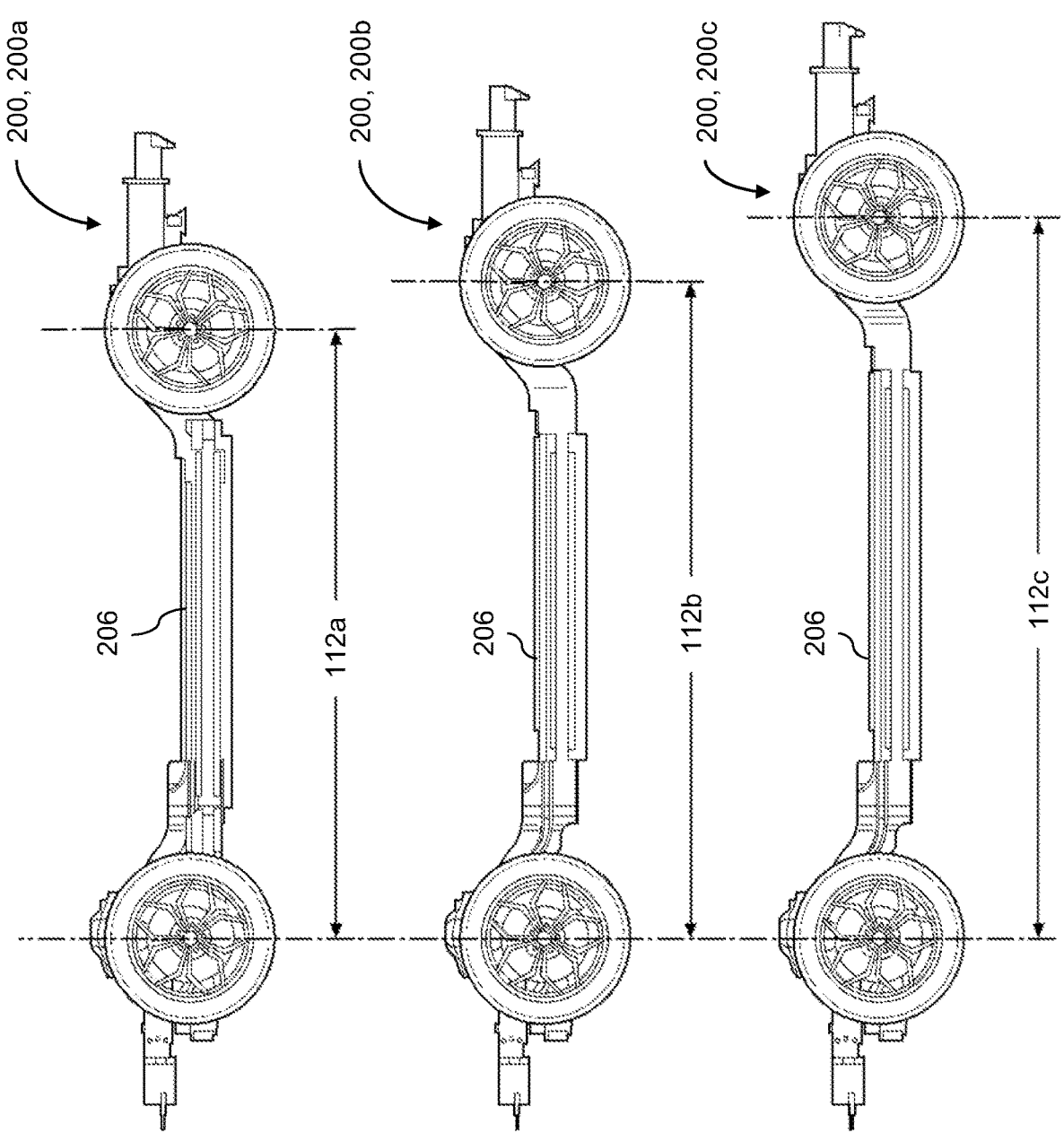
FIG. 8 includes side views of modular platforms with respective frame structures having the extruded rails of FIG. 7, showing different wheelbases between the front vehicle suspension and the rear vehicle suspension based on the different length rails.
Figure 9:
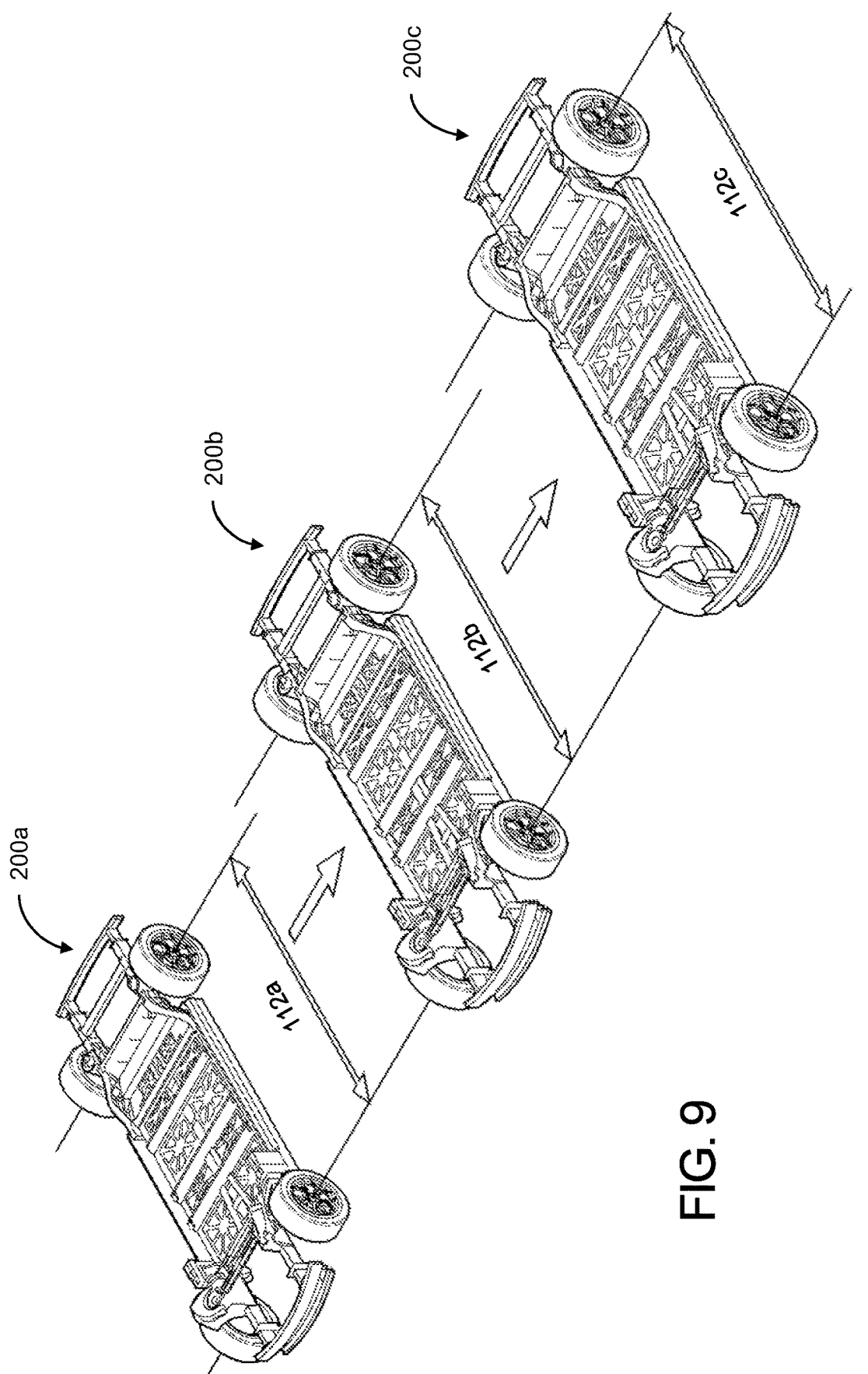
FIG. 9 includes perspective views of the modular platforms of FIG. 8.
Figure 10:
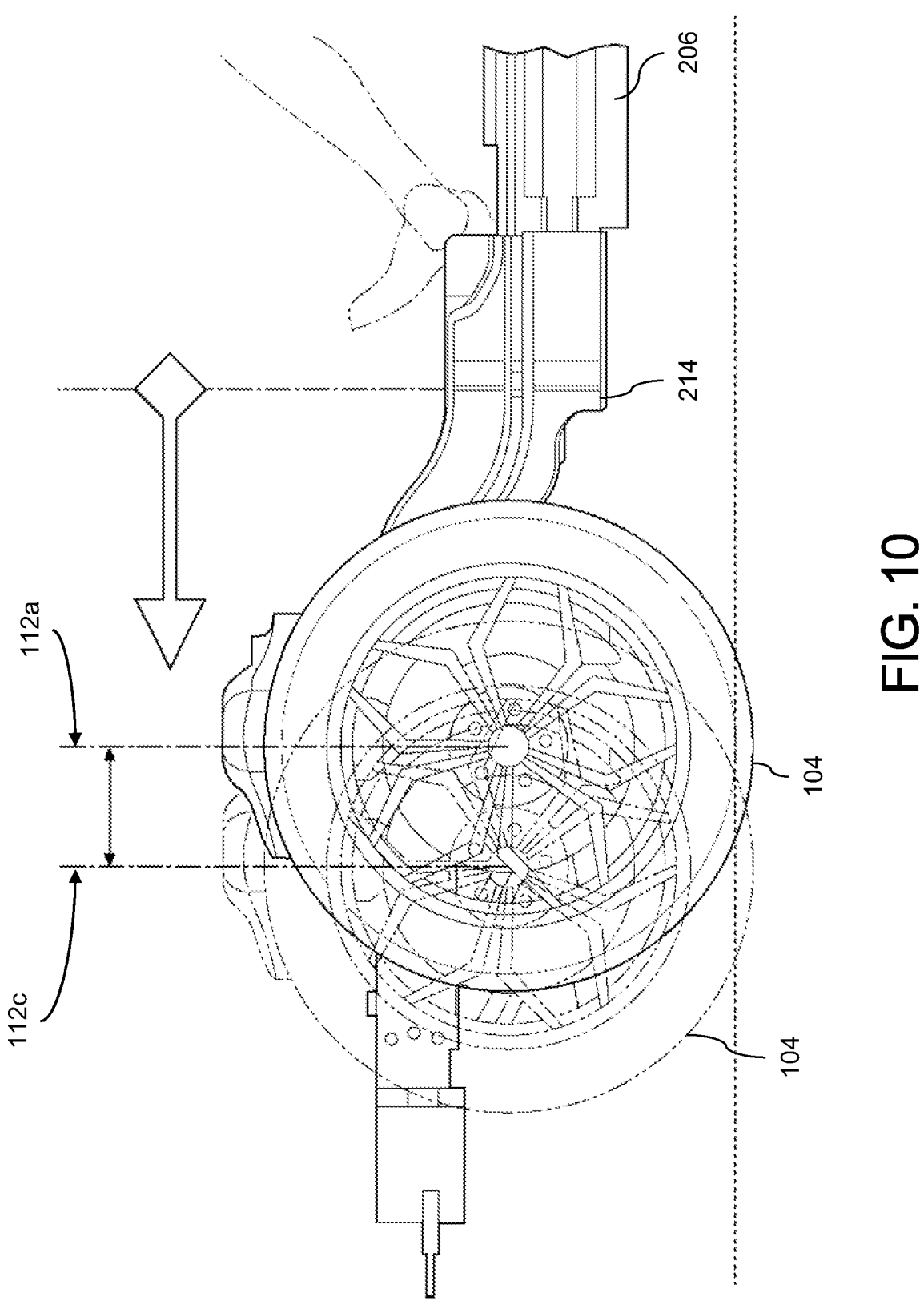
FIG. 10 is a side view of the modular platform, showing the possible wheelbases based on the scalable length rails of the frame structure.

Referring to FIGS. 5 and 6, each rail 206 is an extruded rail (e.g., an extruded aluminum rail) formed with a substantially consistent or continuous cross-section (e.g., FIG. 6) along the length 209 of the rail 206. The rail 206 may include an inner portion or inner rocker 226 and an outer portion or outer rocker 228, where each of the inner rocker 226 and outer rocker 228 is formed as an extruded aluminum part having a constant cross-section. As shown, the inner rocker 226 includes a recess or receiving portion 230 that extends along the length 209 of the rail 206 and along a side surface 232 of the inner rocker 226, and the outer rocker 228 includes a corresponding protrusion or attaching portion 234 that extends along the outer rocker 228 and along a mating surface 236 of the outer rocker 228. The receiving portion 230 of the inner rocker 226 receives the attaching portion 234 of the outer rocker 228 and the side surface 230 of the inner rocker 226 engages and/or is adjacent to the mating surface 236 of the outer rocker 228 when the rail 206 is assembled.

The outer rocker 228 is shorter than the inner rocker 226 to expose or provide access to respective mounting portions or positions 238, 240 along the inner rocker 226 for mounting the rail 206 to the front frame portion 202 and the rear frame portion 204. That is, the inner rocker 226 includes a front frame mounting portion 238 of the rail 206 at or near the front end 205 of the rail 206 that mounts to the front frame portion 202 when the frame structure 201 is assembled, and the inner rocker 226 includes a rear frame mounting portion 240 of the rail 206 at or near the rear end 207 of the rail 206 that mounts to the rear frame portion 204. When the outer rocker 228 mounts to the inner rocker 226, the outer rocker 228 extends along the inner rocker 228 between the front frame mounting portion 238 and the rear frame mounting portion 240, with the respective mounting portions outboard of the outer rocker 228 along the inner rocker 226.

Because the rail 206 is formed via extrusion, the rail 206 has a continuous or constant cross-section along its length 209 and may be formed or trimmed to any suitable length without compromising structural integrity. That is, rails 206 having different lengths 209, 209a-c may be formed from a common die, or rails 206 having the same uniform or initial length 209 may be formed and then trimmed to the different desired lengths 209 prior to mounting of the front frame portion 202 and the rear frame portion 204. Thus, the front frame portion 202, the rear frame portion 204, the front vehicle suspension 106, and the rear vehicle suspension 108 may be held common or standard between vehicles 10 with different wheelbases 112 and the extruded rail 206 is scaled to achieve the different wheelbases 112.

For example, and in reference to FIGS. 7-10, the extruded rail 206 is shown having a first length 209, 209a, a second length 209, 209b that is greater than the first length 209a, and a third length 209, 209c that is greater than the second length 209b. In the illustrated example, the second length 209b is greater than the first length 209a by a length X and the third length 209c is greater than the second length 209b by a length Y.

Because the front frame portion 202 and the rear frame portion 204 mount to the extruded rail 206 in the same manner no matter the length 209 of the extruded rail 206, the extruded rail 206 having the first length 209a produces a first modular platform 200, 200a that produces a first vehicle wheelbase 112, 112a, the extruded rail 206 having the second length 209b produces a second modular platform 200, 200b that produces a second vehicle wheelbase 112, 112b, and the extruded rail 206 having the third length 209c produces a third modular platform 200, 200c that produces a third vehicle wheelbase 112, 112c. The third wheelbase 112c is greater than the second wheelbase 112b and the second wheelbase 112b is greater than the first wheelbase 112a.

In some examples, the extruded rail 206 is initially formed to the longer third length 209c and may be used to produce the third modular platform 200c having the longer third wheelbase 112c. Then the extruded rail 206 may be trimmed to the shorter second length 209b to produce the second modular platform 200b having the shorter second wheelbase 112b or to the even shorter first length 209a to produce the first modular platform 200a having the even shorter first wheelbase 112a. Thus, an end portion of the extruded rail 206 at the third length 209c may provide the mounting portion 238 and the extruded rail 206 may be trimmed inboard of the mounting portion 238 to define a new mounting portion 238 when the extruded rail 206 is at the second length 209b or the first length 209a.

Thus, the rails 206 between the torque box 214 and the C-pillar 222 support the variable wheelbase capability of the modular platform 200 simply by changing the length of the rail 206 (e.g., a change in the extrusion trim line). The inner rocker 226 and the outer rocker 228 are formed via extrusion with common extrusion die and different post operation to achieve the desired rail length 209. The inner rocker 226 and the outer rocker 228 may be formed from extruded aluminum to meet side crash requirements.

With the torque boxes 214 standard to the modular platform 200, a length 213 of the front frame cross-member 212 is scalable prior to or during assembly of the frame structure 201 to adjust the wheel track 114 of the finished vehicle 100. In other words, in order to adjust the wheel track 114 of the vehicle 100 (e.g., to produce a compact vehicle with a narrower wheel track or to produce an SUV having a wider wheel track), the length 213 of the front frame cross-member 212 is scaled or adjusted prior to mounting the torque boxes 214 at opposite ends of the front frame cross-member 212 and/or prior to mounting the front frame portion 202 at the rails 206.

Figures 11, 12, 13, 14:
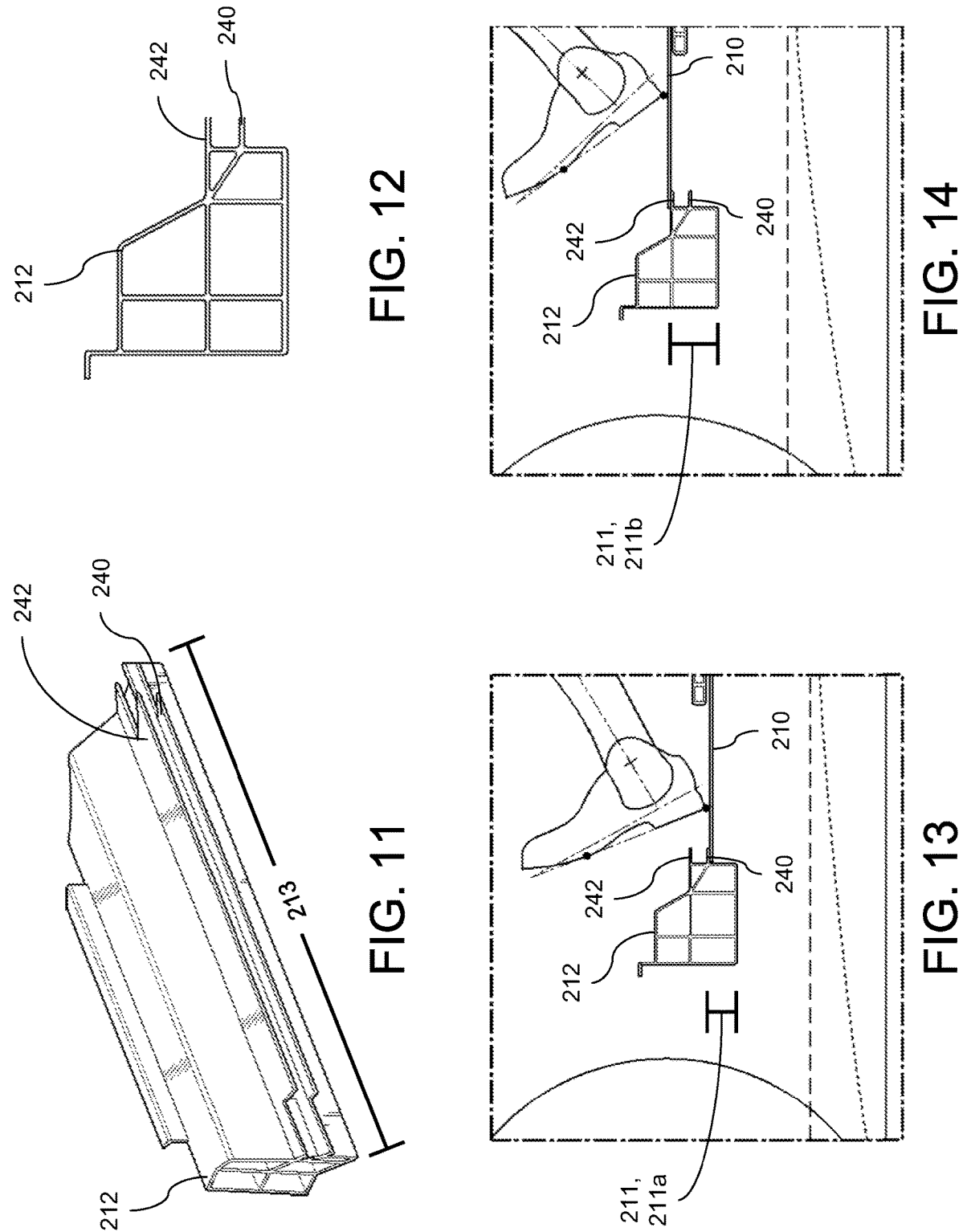
FIG. 11 is a perspective view of a front frame cross-member of the frame structure.
FIG. 12 is a sectional view of the front frame cross-member.
FIG. 13 is a sectional view of the modular platform with a floor panel of the vehicle mounted to a lower flange of the front frame cross-member.
FIG. 14 is a sectional view of the modular platform with the floor panel mounted to an upper flange of the front frame cross-member.

Referring to FIGS. 11 and 12, the front frame cross-member 212 includes an extruded member or rail (e.g., an extruded aluminum member) formed with a substantially consistent or continuous cross-section (e.g., FIG. 12) along the length 213 of the front frame cross-member 212. Similar to the extruded rail 206, the front frame cross-member 212 may be formed or trimmed to any suitable length 213 to define the wheel track 114 of the vehicle 100 without compromising structural integrity of the front frame cross-member 212. That is, front frame cross-members 212 having different lengths 213 may be formed from a common die, or front frame cross-members 212 having the same uniform or initial length 213 may be formed and then trimmed to the different desired lengths 213 prior to mounting of the torque boxes 214 at the ends of the front frame cross-member 212. Thus, the torque boxes 214, the front vehicle suspension 106, the rear vehicle suspension 108, and the rails 206 may be held common or standard between vehicles 100 with different wheel tracks 114 and the front frame cross-member 212 is scaled to achieve the different wheel tracks 114.

That is, to adjust the vehicle wheel track 114, the length 213 of the front frame cross-member 212 is adjusted to move the torque boxes 214 (and therefore the front rails 220 carrying the front vehicle suspension 106) outboard or inboard along a slip plane. No adjustment to the rails 206 is necessary to adjust the vehicle wheel track 114.

Further, and in reference to FIGS. 11-14, the front frame cross-member 212 includes a first flange 240 that extends along the length 213 of the front frame cross-member 212 and that supports the floor panel 210 of the vehicle at a first height 211, 211a of the floor panel 210 relative to the frame structure 201 (FIG. 13). A second flange 242 extends along the length 213 of the front frame cross-member 212 above the first flange 240 and supports the floor panel 210 at a second height 211, 211b relative to the frame structure 201 that is above the first height 211a (FIG. 14).

Thus, without adjusting the frame structure 201, the floor panel 210 can be positioned at the first flange 240 or the second flange 242 of the front frame cross-member 212 based on the desired height 211 of the floor panel 210 relative to the frame structure 201. In some examples, a bottom surface of the front frame cross-member 212 is substantially coplanar with bottom surfaces of the rails 206 and/or other structure of the frame 201 such that the height 211 of the floor panel 210 is measured between the bottom surface of the front frame cross-member 212 and the respective first flange 240 or second flange 242.

In other words, the floor panel 210 is lifted relative to the front frame cross-member 212, such as to adjust a heel point and/or seating position of the driver of the vehicle 100. For example, the floor panel 210 is supported on the first flange 240 of the front frame cross-member 212 when the modular platform 200 is used to produce a sedan or coupe (i.e., a lower seating position of the driver) and the floor panel 210 is supported on the second flange 242 of the front frame cross-member 212 when the modular platform 200 is used to produce an SUV (i.e., a higher seating position of the driver). Thus, the front frame cross-member 212 has modularity to support different floor heights 211, such as to adjust the driver position. Further, because the floor panel 210 and front frame cross-member 212 may be standard or common to different vehicle segments, seating positions and other interior components (e.g., front dashboard, steering column, floor covering or carpeting, seating brackets and chairs, center console, and the like) may be standardized, thus reducing material and design costs.

Figure 15:
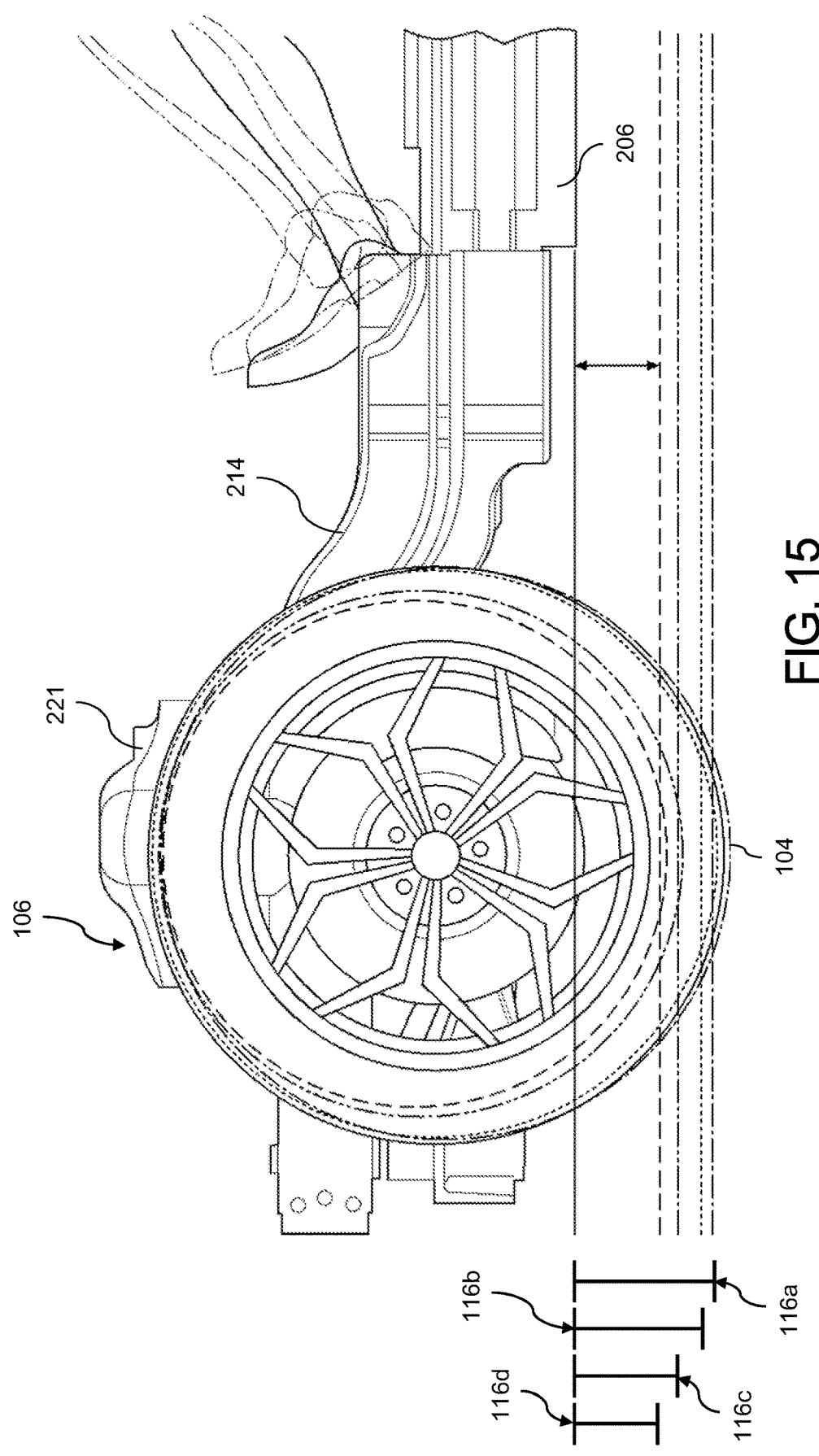
FIG. 15 is a side view of the modular platform, showing the possible ground clearances based on the scalable front and rear vehicle suspensions coupled to the frame structure.

Referring to FIG. 15, with the frame structure 201 standard, the front vehicle suspension 106 and/or the rear vehicle suspension 108 is scalable to adjust the ground clearance 116 of the vehicle 100 (e.g., a bottom surface of the frame structure 201) relative to a ground surface. That is, without changing or adjusting the front frame portion 202, the rear frame portion 204, or the rails 206, the ground clearance 116 of the vehicle 100 is adjusted by adjusting a length or height of the suspension systems.

That is, the front shock tower casting 221 on the front rails 220 provides variable ground clearance through ride height adjustable shocks. For example, a length of a strut and/or shock member of the front vehicle suspension 106 and/or rear vehicle suspension 108 is adjusted relative to the front rails 220 and the shock tower 221 based on the desired ground clearance 116 of the vehicle 100 produced using the modular platform 200. The front vehicle suspension 106 and/or the rear vehicle suspension 108 may utilize characteristics of any suitable vehicle suspension, such as the variable ride height vehicle suspensions described in U.S. patent application Ser. No. 18/148,848, filed on Dec. 30, 2022, which is hereby incorporated herein by reference in its entirety.

For example, the front vehicle suspension 106 is adjustable to a provide a first or maximum ground clearance 116, 116a, a second ground clearance 116, 116b that is less than the first ground clearance 116a, a third ground clearance 116, 116c that is less than the second ground clearance 116b, and a fourth or minimum ground clearance 116, 116d that is less than the third ground clearance 116c. Thus, the modular platform 200 supports ground clearance requirements for vehicle segments ranging from luxury coupes to SUVs.

Figures 16, 17:
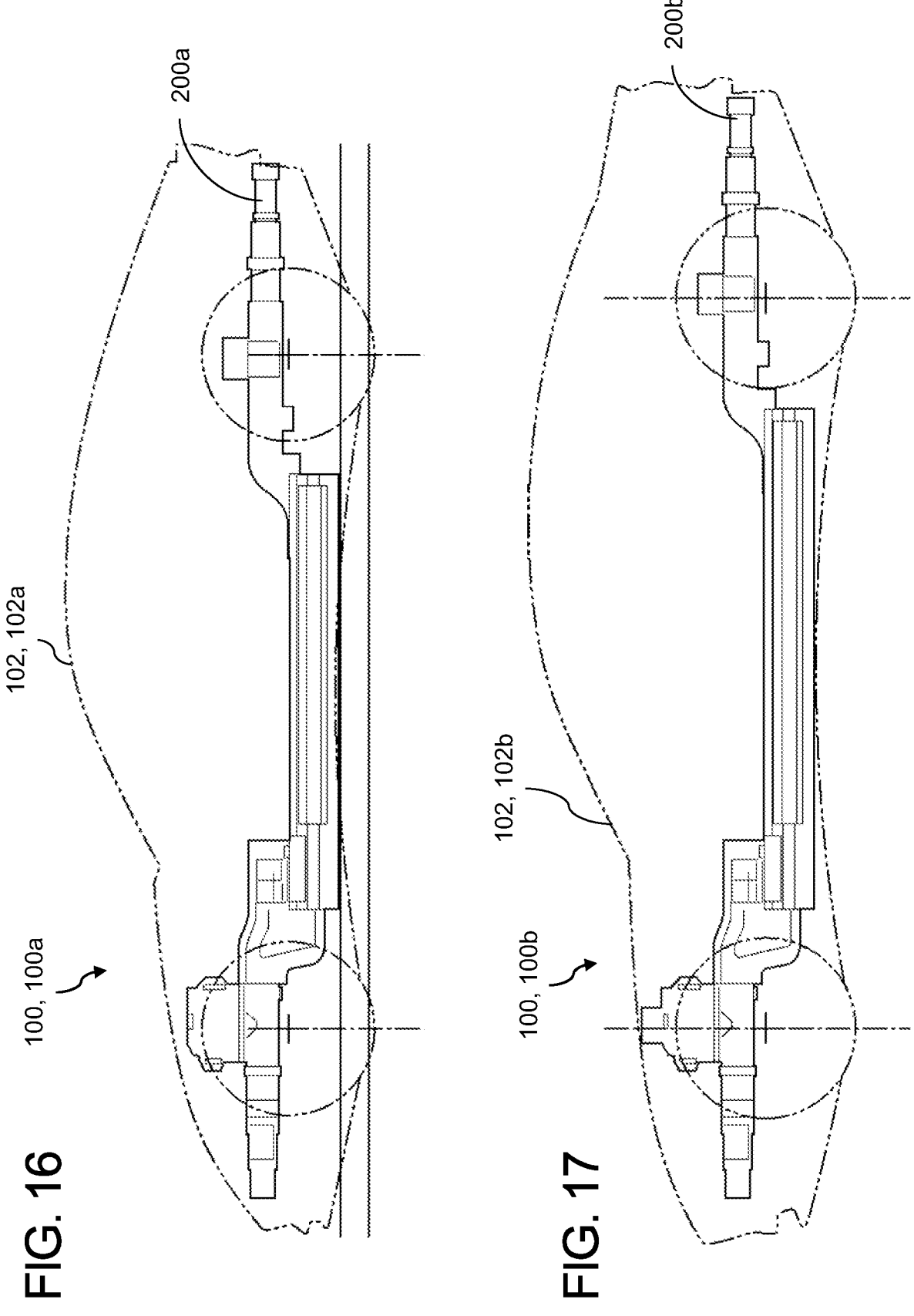
FIG. 16 is a side view of a coupe vehicle body supported on the frame structure.
FIG. 17 is a side view of a sedan vehicle body supported on the frame structure.
Figures 18, 19:
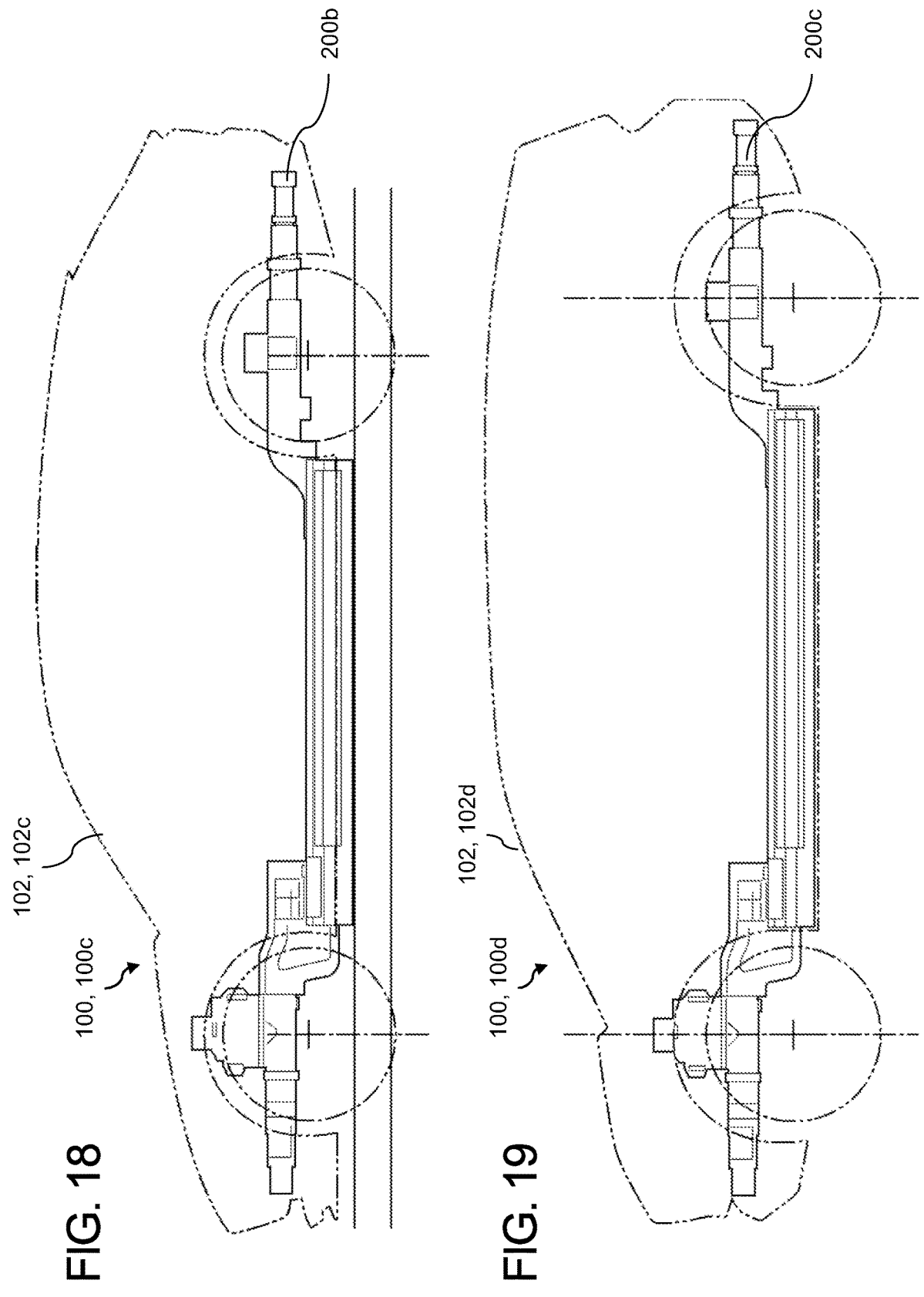
FIG. 18 is a side view of a CUV vehicle body supported on the frame structure.
FIG. 19 is a side view of an SUV vehicle body supported on the frame structure.

As shown in FIGS. 16-19, the modular platform 200 may thus be mated with a vehicle body 102, 102*a-d* to produce a vehicle 100, 100*a-d* having characteristics (e.g., wheelbase 112, wheel track 114, and ground clearance 116) suitable for any vehicle segment. FIG. 16 depicts a coupe 100, 100*a* produced by mating a coupe body 102, 102*a* with the first modular platform 200*a* having the first wheelbase 112*a*. FIG. 17 depicts a sedan 100, 100*b* produced by mating a sedan body 102, 102*b* with the second modular platform 200*b* having the second wheelbase 112*b*. FIG. 18 depicts a cross-over or CUV 100, 100*c* produced by mating a cross-over or CUV body 102, 102*c* with the second modular platform 200*b* having the second wheelbase 112*b*, and with the floor panel 210 adjusted to the second flange 242 of the front cross-member 212 to provide a taller ride height for the occupants of the CUV 102*c* as compared to the sedan 102*b* (where the floor panel 210 is adjusted to the first flange 240 to provide a shorter ride height for the occupants of the sedan 100*b*). FIG. 19 depicts an SUV 100, 100*d* produced by mating an SUV body 102, 102*d* with the third modular platform 200*c* having the third wheelbase 112*c*. It should be understood that the modular platform 200 may be adjusted in any suitable manner discussed herein and mated with one of the vehicle bodies 102 to produce vehicles 100 in a variety of different segments and embodying a variety of different characteristics and dimensions.

Referring to FIGS. 20-25, the modular platform 200 is equipped with a front crash management system 2000 that mounts at the respective front rails 220 of the frame structure 201 (such as via bolts or other suitable threaded fasteners) and that provides suitable crash performance and energy absorbance during vehicle collisions for vehicles 100 produced with the modular platform 200 and having different ground clearances 116. In other words, the front crash management system 2000 is configured to provide a frontal load path for vehicle collisions at regulated or required heights without requiring adjustment (e.g., without requiring adjustment of dimensions or mounting position of the front crash management system 2000) when the ground clearance 116 provided by the modular platform 200 is adjusted. Thus, the front crash management system 2000 is standard to modular platforms 200 across the range of wheelbases 112, wheel tracks 114, and ground clearances 116.

The front crash management system 2000 includes front rail mounting brackets 2002, 2002*a-b* that mount to the respective front rails 220 of the front frame portion 202 to mount the front crash management system 2000 at the frame structure 201. That is, a first front rail mounting bracket 2002, 2002*a* mounts to the first front rail 220*a* and a second front rail mounting bracket 2002, 2002*b* mounts to the second front rail 220*b*. A first crash rail 2004, 2004*a* and a second crash rail 2004, 2004*b* extend respectively from the first front rail mounting bracket 2002*a* and the second front rail mounting bracket 2002*b*. A front bumper beam 2006 mounts to ends of the first crash rail 2004*a* and the second crash rail 2004*b* opposite the respective front rail mounting brackets 2002 and extends between the respective crash rails 2004.

Respective bumper beam mounting brackets 2008, 2008*a-b* mount the bumper beam 2006 to the crash rails 2004 and provide pass-through mounting positions, such as for body panels of the vehicle 100. In the illustrated example, a first bumper beam mounting bracket 2008, 2008*a* mounts the bumper beam 2006 to the first crash rail 2004*a* and provides a toe hook bracket 2010. A second bumper beam mounting bracket 2008, 2008*b* mounts the bumper beam 2006 to the second crash rail 2004*b*. Both bumper beam mounting brackets 2008 provide a respective bolt access region 2012 for mounting the front bumper to the vehicle 100.

Further, a first ankle catcher rail 2014, 2014*a* and a second ankle catcher rail 2014, 2014*b* extend respectively from the first front rail mounting bracket 2002*a* and the second front rail mounting bracket 2002*b* at respective positions below the first crash rail 2004*a* and the second crash rail 2004*b*. An ankle catcher rail 2016 mounts to ends of the first ankle catcher rail 2014*a* and the second ankle catcher rail 2014*b* opposite the respective front rail mounting brackets 2002 and extends between the ankle catcher rails 2016 and below the front bumper beam 2006.

As shown in FIGS. 21-25, each of the front bumper beam 2006 (FIG. 21), the respective crash rails 2004 (FIG. 22), the respective front rail mounting brackets 2002 (FIG. 23), the respective ankle catcher rails 2014 (FIG. 24), and the ankle catcher 2016 (FIG. 25) are extruded components (e.g., extruded aluminum), which improves crash performance and occupant safety during frontal collisions of the vehicle 100 while reducing vehicle weight. The extruded design provides multiple compartments and structure to absorb the collision and increase structural integrity of the system 2000. That is, the extruded components provide crash absorbing compartments integrated into individual parts, rather than several different stamped parts joined together. Moreover, the front crash management system 2000 is a bolt-on design to allow for easy replacement of the system following a collision.

Referring to FIGS. 26A and 26B, the front crash management system 2000 overlaps required or regulated impact zones 2600, 2600*a-b* when the modular platform 200 is configured to provide any suitable ground clearance 116 of the vehicle 100. That is, during frontal crash tests, a pendulum 2602 impacts the front bumper beam 2006 within a first impact zone 2600*a* (e.g., 20 inches from the ground surface) and within a second impact zone 2600*b* (e.g., 16 inches from the ground surface). The front crash management system 2000 is positioned at the modular platform 200 so that the front bumper beam 2006 receives the impact from the pendulum within both the first impact zone 2600*a* and the second impact zone 2600*b*, when the modular platform 200 provides any suitable ground clearance 116, such as the maximum or first ground clearance 116*a* (FIG. 26B) and the minimum or fourth ground clearance 116*d* (FIG. 26A), without requiring adjustment or modification to the front crash management system 2000.

Thus, the modular front crash management system 2000 is designed to meet low and high speed crash test requirements for vehicles 100 produced on the modular platform 200, such as for the coupe to SUV vehicle segments. The bumper beam 2006 section height is developed to meet required overlap, such as for 16 to 20 inch pendulum positions between different vehicle segments with different ground clearance parameters. The crash rail 2006 is designed to achieve best in class crash ratings. The front crash management system 2000 attaches to the front rails 220 as a bolt-on design through the attachment plates 2002. This bolt-on approach helps to replace the system 2000 in case of any damage. The ankle catcher rail 2016 supports pedestrian protection and acts as a secondary load path in the event of a frontal crash.

Figure 27:
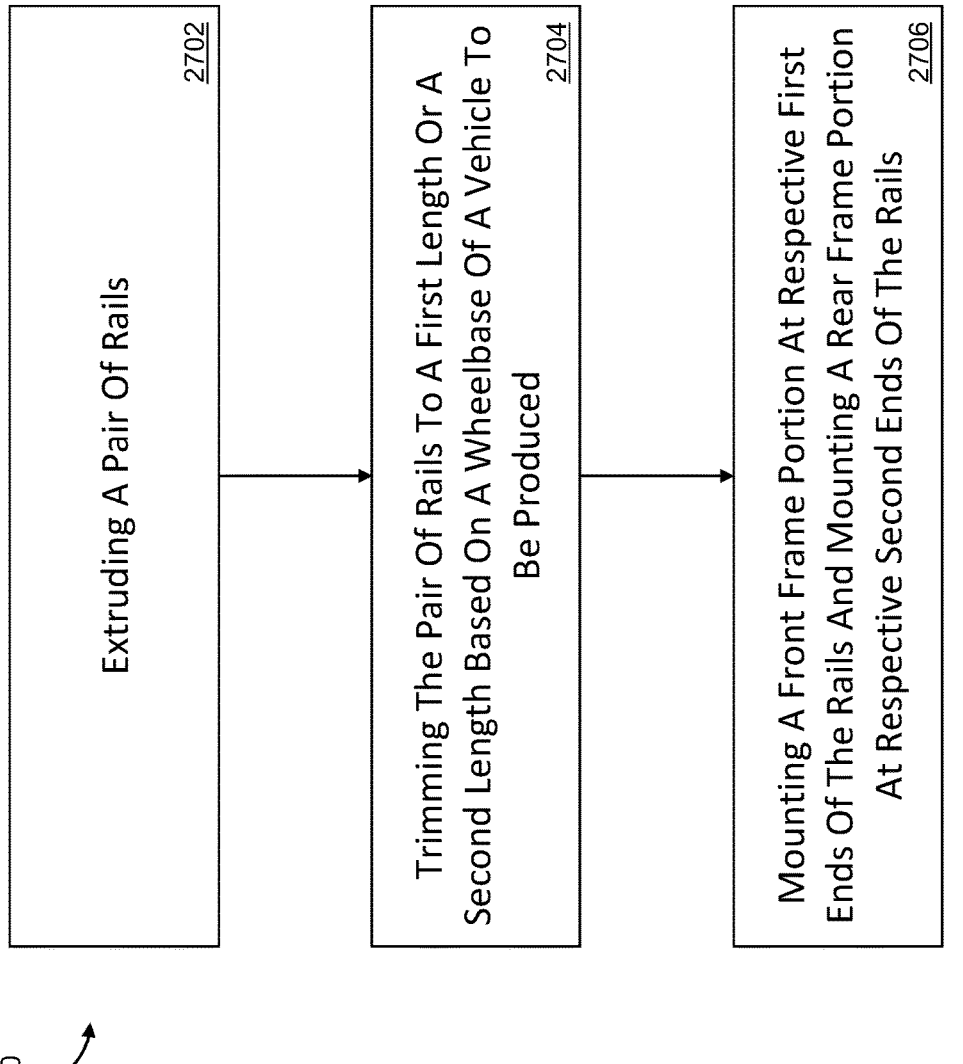

FIG. 27 provides a flowchart of an exemplary arrangement of operations for a method 2700 of manufacturing the modular platform 200 for the vehicle 100. At operation 2702, the method 2700 includes extruding a pair of rails 206 having a substantially constant or continuous cross-section.

At operation 2704, the method 2700 includes trimming the pair of rails 206 to a first length 209 (e.g., length 209*b*) or a second length 209 (e.g., length 209*a*) that is less than the first length 209 (e.g., length 209*b*). The pair of extruded rails 206 are trimmed to the first length (e.g., length 209*b*) to provide a first wheelbase 112 (e.g., wheelbase 112*b*) of the vehicle 100 and the pair of extruded rails 206 are trimmed to the second length (e.g., length 209*a*) to provide a second wheelbase 112 (e.g., wheelbase 112*a*) of the vehicle 100 that is less than the first wheelbase 112 (e.g., wheelbase 112*b*). After trimming the pair of rails 206, the method 2700 includes at operation 2704, mounting a front frame portion 202 at respective first ends 205 of the pair of rails 206 and mounting a rear frame portion 204 at respective second ends 207 of the pair of rails 206 that are opposite the first ends 205. The front frame portion 202 is receives a front vehicle suspension 106 of the vehicle 100 and the rear frame portion 204 receives a rear vehicle suspension 108 of the vehicle 100.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. A modular platform for a vehicle, the modular platform comprising:

a scalable frame structure, the frame structure comprising:

a front frame portion configured to receive a front vehicle suspension, the front frame portion comprising a front frame cross-member that extends between respective first ends of the pair of rails, the front frame cross member comprising:

a first flange that extends along the length of the front frame cross-member and that is configured to support a floor panel of the vehicle at a first floor height relative to the pair of rails; and a second flange that extends along the length of the front frame cross-member and above the first flange and that is configured to support the floor panel at a second floor height relative to the pair of rails that is above the first floor height;

a rear frame portion configured to receive a rear vehicle suspension; and a pair of rails extending between the front frame portion and the rear frame portion along opposing sides of the frame structure, wherein each rail in the pair of rails comprises a length that is scalable to adjust a wheelbase of the vehicle between the front vehicle suspension and the rear vehicle suspension; and a battery pack supported on the frame structure, wherein a length of the front frame cross-member is scalable to adjust a wheel track of the vehicle between a pair of wheels coupled to the front vehicle suspension.

2. The modular platform of claim 1, wherein:

each rail of the pair of rails comprises an extruded rail; and the extruded rail is trimmed to one of:

a first length to adjust the wheelbase of the vehicle to a first wheelbase; or a second length that is less than the first length to adjust the wheelbase of the vehicle to a second wheelbase that is less than the first wheelbase.

3. The modular platform of claim 2, wherein the extruded rail comprises:

a first mounting position configured to receive one of the front frame portion or the rear frame portion when the extruded rail is trimmed to the first length;

a second mounting position configured to receive the one of the front frame portion or the rear frame portion when the extruded rail is trimmed to the second length; and one or more third mounting positions configured to receive the other one of the front frame portion or the rear frame portion.

4. The modular platform of claim 3, wherein, when the extruded rail is trimmed to the second length, the extruded rail is trimmed between the first mounting position and the second mounting position and the first mounting position is removed from the extruded rail.

5. The modular platform of claim 1, wherein:

the front frame cross-member comprises an extruded cross-member; and the extruded cross-member is trimmed to one of:

a first length to adjust the wheel track to a first wheel track; or a second length that is less than the first length to adjust the wheel track to a second wheel track that is less than the first wheel track.

6. The modular platform of claim 1, wherein:

the vehicle comprises a sedan or a coupe and the first flange of the front frame cross-member supports the floor panel; or the vehicle comprises an SUV and the second flange of the front frame cross-member supports the floor panel.

7. The modular platform of claim 1, wherein the floor panel, when supported at the front frame cross-member, extends above and along the battery pack supported on the frame structure.

8. The modular platform of claim 1, wherein respective lengths of the front vehicle suspension and the rear vehicle suspension are scalable to adjust a ground clearance of the vehicle between the frame structure and a ground surface.

9. The modular platform of claim 1, wherein the pair of rails extend along and mount to opposing sides of the battery pack to support the battery pack on the frame structure.

10. The modular platform of claim 1, wherein the frame structure is configured to support a body of the vehicle.

11. The modular platform of claim 1, wherein the battery pack is operable to electrically power a drivetrain of the vehicle.

12. A vehicle comprising:

a scalable frame structure, the frame structure comprising:

a front frame portion configured to receive a front vehicle suspension, the front frame portion comprising a front frame cross-member that extends between respective first ends of the pair of rails, the front frame cross member comprising:

a first flange that extends along the length of the front frame cross-member and that is configured to support a floor panel of the vehicle at a first floor height relative to the pair of rails; and a second flange that extends along the length of the front frame cross-member and above the first flange and that is configured to support the floor panel at a second floor height relative to the pair of rails that is above the first floor height;

a rear frame portion configured to receive a rear vehicle suspension; and a pair of rails extending between the front frame portion and the rear frame portion along opposing sides of the frame structure, wherein each rail of the pair of rails comprises a length that is scalable to adjust a wheelbase of the vehicle between the front vehicle suspension and the rear vehicle suspension; and a battery pack supported on the frame structure, the battery pack operable to electrically power a drivetrain of the vehicle, wherein a length of the front frame cross-member is scalable to adjust a wheel track of the vehicle between a pair of wheels coupled to the front vehicle suspension.

13. The vehicle of claim 12, wherein:

each rail of the pair of rails comprises an extruded rail; and the extruded rail is trimmed to one of:

a first length to adjust the wheelbase of the vehicle to a first wheelbase; or a second length that is less than the first length to adjust the wheelbase of the vehicle to a second wheelbase that is less than the first wheelbase.

14. The vehicle of claim 13, wherein the extruded rail comprises:

a first mounting position configured to receive one of the front frame portion or the rear frame portion when the extruded rail is trimmed to the first length;

a second mounting position configured to receive the one of the front frame portion or the rear frame portion when the extruded rail is trimmed to the second length; and one or more third mounting positions configured to receive the other of the front frame portion or the rear frame portion.

15. The vehicle of claim 14, wherein, when the extruded rail is trimmed to the second length, the extruded rail is trimmed between the first mounting position and the second mounting position and the first mounting position is removed from the extruded rail.

16. The vehicle of claim 12, wherein:

the front frame cross-member comprises an extruded cross-member; and the extruded cross-member is trimmed to one of:

a first length to adjust the wheel track to a first wheel track; or a second length that is less than the first length to adjust the wheel track to a second wheel track that is less than the first wheel track.

17. The vehicle of claim 12, wherein:

the vehicle comprises a sedan or a coupe and the first flange of the front frame cross-member supports the floor panel; or the vehicle comprises an SUV and the second flange of the front frame cross-member supports the floor panel.

18. The vehicle of claim 12, wherein the floor panel, when supported on the front frame cross-member, extends above and along the battery pack supported at the frame structure.

19. The vehicle of claim 12, wherein respective lengths of the front vehicle suspension and the rear vehicle suspension are scalable to adjust a ground clearance of the vehicle between the frame structure and a ground surface.

20. The vehicle of claim 12, wherein the pair of rails extend along and mount to opposing sides of the battery pack to support the battery pack on the frame structure.

21. The vehicle of claim 12, comprising a body supported at the frame structure.

22. A method for manufacturing a modular platform for a vehicle, the method comprising:

trimming a front frame cross-member to one of:

a first length to adjust a wheel track of the vehicle between a pair of wheels coupled to the front vehicle suspension to a first wheel track; or a second length that is less than the first length to adjust the wheel track to a second wheel track that is less than the first wheel track;

mounting a front frame portion at respective first ends of a pair of extruded rails, the front frame portion configured to receive a front vehicle suspension, the front frame portion comprising the front frame cross-member that, with the front frame portion mounted at the respective first ends of the pair of extruded rails, extends between the respective first ends of the pair of extruded rails;

mounting a rear frame portion at respective second ends of the pair of extruded rails, the respective second ends opposite the respective first ends and the rear frame portion is configured to receive a rear vehicle suspension; and before mounting the front frame portion and the rear frame portion at the pair of extruded rails, trimming the pair of extruded rails to one of:

a first length to provide a first wheelbase of the vehicle between the front vehicle suspension and the rear vehicle suspension; or a second length that is less than the first length to provide a second wheelbase of the vehicle that is less than the first wheelbase.

23. The method of claim 22, wherein the front frame cross-member comprises:

a first flange that extends along the length of the front frame cross-member and that is configured to support a floor panel of the vehicle at a first floor height relative to the pair of extruded rails; and a second flange that extends along the length of the front frame cross-member and above the first flange and that is configured to support the floor panel at a second floor height relative to the pair of extruded rails that is above the first floor height.

24. The method of claim 23, wherein:

the vehicle comprises a sedan or a coupe and the method further comprises mounting the floor panel at the first flange of the front frame cross-member; or the vehicle comprises an SUV and the method further comprises mounting the floor panel at the second flange of the front frame cross-member.

25. The method of claim 22, further comprising, with the front frame portion and the rear frame portion mounted at the pair of extruded rails to form a frame structure of the vehicle, mounting a battery pack at the frame structure.

* * * * *